United States Patent [19]
Povey

[11] 3,710,242
[45] Jan. 9, 1973

[54] SERVICE BUSHING TEST
[75] Inventor: Edmund H. Povey, Medford, Mass.
[73] Assignee: Doble Engineering Company, Belmont, Mass.
[22] Filed: Feb. 12, 1971
[21] Appl. No.: 114,780

Related U.S. Application Data
[63] Continuation-in-part of Ser. No. 26,541, April 8, 1970, abandoned.

[52] U.S. Cl. .................................. 324/54, 324/60 R
[51] Int. Cl. ........................ G01r 31/12, G01r 27/26
[58] Field of Search ................. 324/60, 83 A, 126, 54

[56] References Cited

UNITED STATES PATENTS 2,307,499  1/1943  Frakes............................... 324/60 X Primary Examiner—Alfred E. Smith
Attorney—Willis M. Ertman

[57] ABSTRACT

Apparatus for measuring a defect characteristic of a bushing which has a high voltage electrode passing through a grounded flange, insulating material around the electrode and a capacitance tap, while the bushing is in service connected to a high voltage source, includes an impedor connected permanently between the capacitance tap of the bushing and ground. The impedance of this impedor is so low relative to the impedance of the insulating material of the bushing between the capacitance tap and ground that the voltage between the capacitance tap and ground does not exceed one hundred volts. A pluggable connection permits an external circuit to be coupled to the impedor for providing an indication of a defect characteristic of the bushing.

19 Claims, 9 Drawing Figures

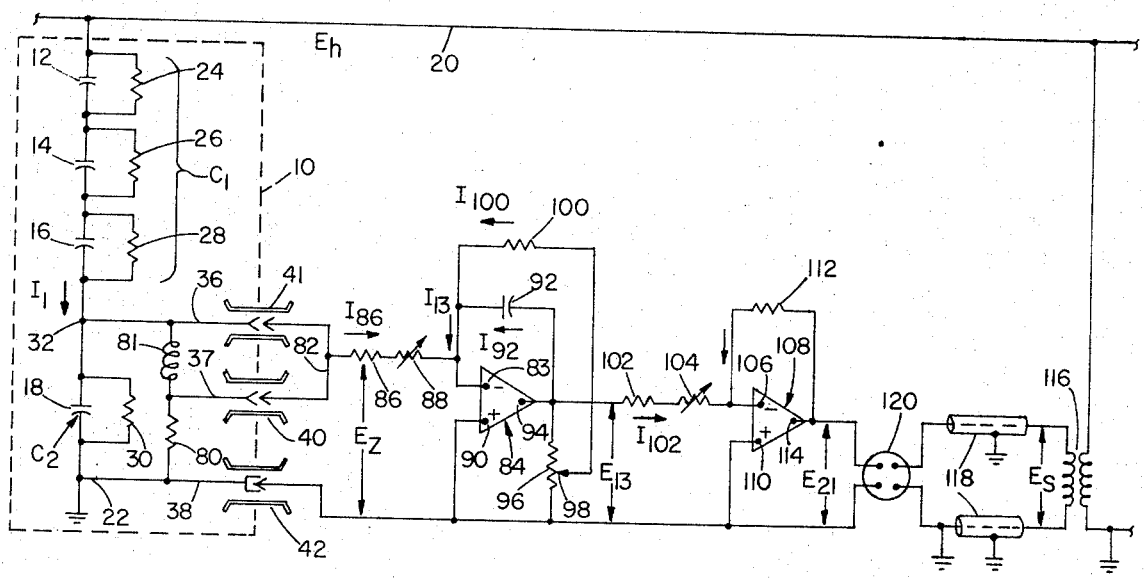
FIG 4
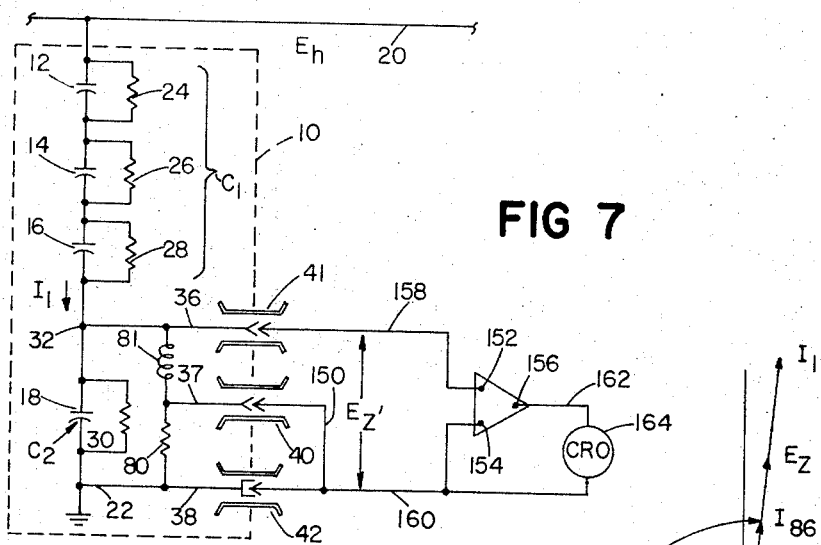
FIG 7
FIG 6
FIG 5
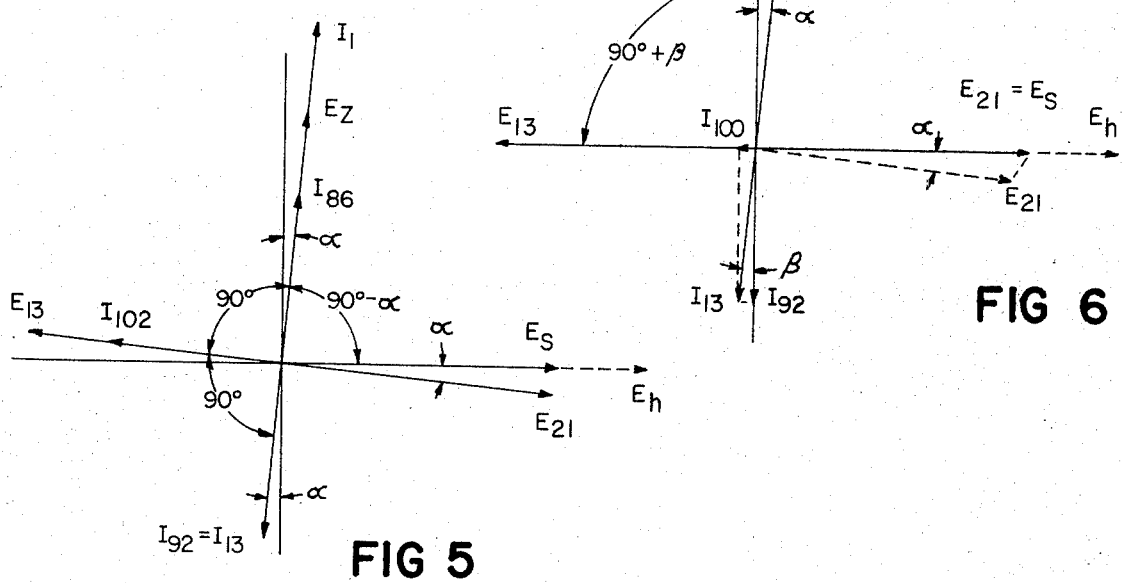

PATENTED JAN 9 1973

SERVICE BUSHING TEST

This application is a continuation-in-part of my co-pending patent application Ser. No. 26,541 filed Apr. 8, 1970 now abandoned, entitled "Method and Apparatus for Measuring the Capacitance and Defect Angle in a High Voltage Bushing."

This invention relates to apparatus for testing bushings while they are in service. Such bushings are used with high-voltage electrical apparatus as, for example, transformers and oil switches, and they usually consist of a cylindrical high-voltage electrode passing through a grounded flange fastened to the apparatus housing, and insulated with sheet insulating material wrapped about the conductor and enclosed within a protective porcelain shell. For use at the higher voltages, these bushings are often oil-filled. Metallic foil interwrapped between the layers of insulating material provides a number of series capacitors between the high-voltage electrode and ground, which serves to distribute the electrical stress nearly uniformly within the insulation.

During service, the insulation of such bushings deteriorates and unless corrective measures are taken, failure may occur, resulting in the interruption of power service and damage to the electrical equipment. Thus, it is important to test such bushings periodically to detect deterioration before failure occurs. Obviously, it is highly advantageous to be able to make such tests without removing the bushings from service, thus avoiding making changes in system-switching arrangements, as well as any interruptions of the power in the apparatus associated with the bushings.

In order to test a bushing that is in service, the bushing must be equipped with a test electrode, and high-voltage bushings are furnished with a capacitance tap which can be used as a test electrode. The capacitance tap consists of a connection to a layer of metallic foil near the outer wrap of the insulation material, which connection is brought out to a terminal near the flange of the bushing. The major insulation of the bushing lies between the center conductor and the capacitance tap layer.

The capacitance tap may be connected to a potential device for activating relays or instruments, but in most bushings, it is not used. It may be grounded to the flange or may be left open-circuited and covered with a protective cap. On open circuit, the tap can have a voltage in the order of several thousand volts.

In order to use the capacitance tap for test purposes, previous testing means required the removal of any other tap connection, such as a ground or the lead to a potential device. Since the open-circuit voltage of the tap is sufficiently high to be a potential danger to personnel making the test connection, protective measures must be used.

Accordingly it is an object of the invention to provide novel and improved methods and apparatus for measuring characteristics of high voltage bushings while they are in service.

Another object of the invention is to provide novel and improved means for the measurement of the capacitance and defect angle of the main insulation of high voltage bushings, while they are in service, with apparatus that is easily and safely installed and operated and provides accurate readings.

Another object of the invention is to provide novel and improved means for the detection of corona or partial discharge damage in the high voltage bushings while they are in service and with apparatus that is easily and safely installed and operated and provides accurate readings.

Another object of the invention is to provide novel and improved high voltage bushing arrangements to which test apparatus may be connected and disconnected readily.

A still further object of the invention is to provide a novel and improved high voltage testing arrangement which maintains the potential of the capacitance tap at a safe, low value and does not require removal of the bushing from service for testing.

According to methods and apparatus of the invention, a defect characteristic of a high voltage bushing which has a conductor passing through a grounded flange, with insulating material around the conductor and a capacitance tap, is measured while the bushing is in service connected to a high voltage source, through the provision of an impedor connected permanently between the capacitance tap of the bushing and ground, and adapted to be coupled to an external circuit. The impedance of the impedor is so low relative to that of the insulating material and to that of the bushing between the capacitance tap and ground that the current in the impedor is determined almost solely by the impedance of the insulating material. The nature of the external measuring circuit depends on which type of measurement is made. When measurement of defect angle and capacitance is desired, the external circuit utilizes a low reference voltage having known voltage ratio and phase angle relation to the high voltage source. The apparatus produces an output voltage as a function of the current flow in the impedor and includes means to compare the output voltage in both magnitude and phase with the reference voltage. The external measuring circuit used to detect corona or partial discharge in the bushing utilizes a frequency selective amplifier to amplify those frequencies of interest and an appropriate measuring device to observe their relative strength. The impedor and the external circuits are arranged to be connected to each other by detachable leads using a polarized connector.

In preferred embodiments of apparatus for measuring capacitance and defect angle, the apparatus has connecting means to permit the coupling of the external measuring circuit to the impedor without interruption of the current through the bushing, amplifying means in the external measuring circuit including phase shifting means, preferably calibrated in terms of bushing power factor, to adjust the phase of an output voltage in conformity with the phase of a reference voltage which is established at a remote location, magnitude control means to cause the output voltage to attain magnitude equality with the reference voltage, and shielded leads to conduct the reference voltage to the external measuring circuit for comparison with the output voltage.

In one such embodiment of the invention the impedor is a fixed capacitor connected permanently between the capacitance tap and ground, the reactance of the capacitor being so low that current therethrough is determined almost solely by the impedance of the insulating material and the voltage between the capacitance tap and ground is maintained at less than 100 volts. The capacitor provides a voltage responsive to the current through the insulating material. Amplifying means with negligible phase shift and an adjustable gain control provides an output voltage in response to the voltage from the capacitor. The low reference voltage is applied to a potentiometer with an adjustable contactor and means are arranged to indicate when the voltage difference between the output voltage and the voltage at the contactor attains a minimum value. Another embodiment further includes an adjustable second capacitor, connected in parallel with the first capacitor and calibrated in terms of the capacitance of the bushing, phase shifting means to adjust the phase of the output voltage to conformity with the phase of the low reference voltage, and control means to cause the output voltage to attain magnitude equality with the reference voltage.

In another embodiment of the invention the impedor is a permanently connected resistor of low value. The apparatus also has adjustable resistive control means arranged to relate the capacitive component of the output voltage to the capacitance of the bushing, phase shifting means arranged to cause the phase of the output voltage to conform to the phase of the low reference voltage, adjustable resistive control and amplifying means arranged to cause the magnitude of the output voltage to conform to the magnitude of the low reference voltage, and detecting means to compare the output voltage with the reference voltage.

In a further aspect of the invention, for the detection or measurement of partial discharges, an inductive impedor is included in the permanent connection between the capacitance tap and ground. The impedor has a low reactance at the power frequency so that the tap voltage, due to the high-voltage power system, is never in excess of 100 volts. Partial discharges produce voltages across the inductive impedor which contain components of much higher frequency than that of the power system. The high frequencies are amplified by a frequency-selective amplifier and sensed, for example, by display on a cathode ray oscilloscope wherein the relative amplitudes of the output signal pulses are evaluated, or by a peak reading meter or by separation of frequencies with a high pass filter, rectification and reading on a DC instrument.

In a preferred embodiment of the invention, resistive and inductive impedors are connected in series and the two impedors are permanently connected between the capacitance tap and ground. In a first mode the inductive impedor is short circuited by the connecting means and the resistive impedor is used to measure capacitance and defect and while in a second mode, the resistive impedor is short circuited and the inductive impedor is used to sense partial discharge defects.

The invention thus provides methods and apparatus for accurately measuring defect characteristics of a high voltage bushing while that bushing is in service; and is particularly useful in facilitating the measurement of bushing capacitance and defect angle, and/or partial discharge defects.

Other objects, features and advantages will become apparent from the following description of particular embodiments of the invention, taken together with the attached drawings thereof, in which:

FIG. 4 is a schematic diagram of another embodiment of the invention in which resistive and inductive impedors are employed;

FIG. 5 is a phasor diagram of the voltage and currents of the circuit of FIG. 4 (with the inductive impedor short circuited) before the system is adjusted to measure the capacitance and phase angle of the bushing;

FIG. 6 is the phasor diagram of FIG. 5 after the adjustment has been made;

FIG. 7 is a schematic diagram of the bushing and impedor arrangement of FIG. 4 with the resistive impedor short circuited and another external circuit connected;

Figures 1, 2, 3:
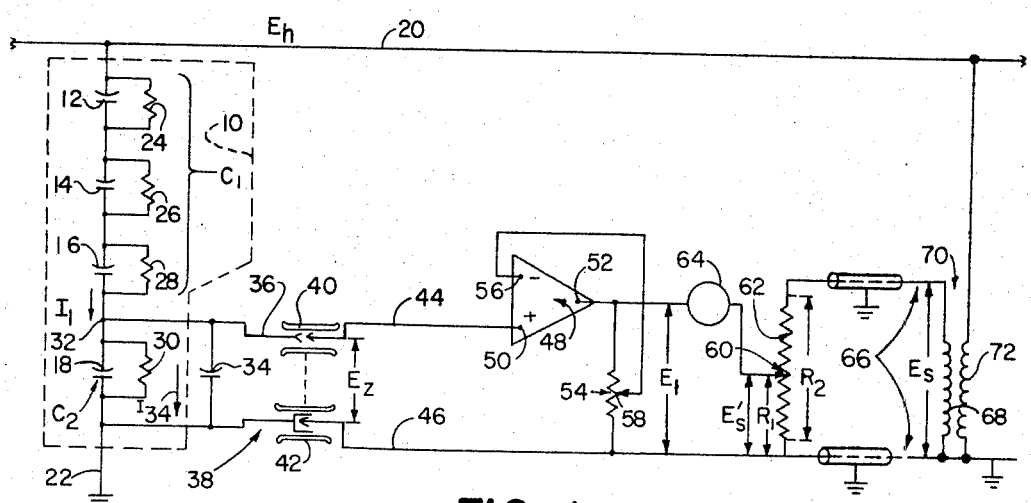
FIG. 1 is a schematic diagram of a bushing and testing apparatus in accordance with the invention.
FIG. 2 is a phasor diagram representing the voltages and currents for the circuit of FIG. 1.
FIG. 3 is a perspective view, showing adjusting dials and the indicating needle, of the assembled testing apparatus in a metallic container.

With reference to FIG. 1, a typical bushing 10 has alternate layers of metallic foil and sheet insulating material which may be represented schematically as sectional series capacitors 12, 14, 16, and 18 connected between the high voltage bushing conductor 20 and ground 22. As will be readily understood by those skilled in the art, the actual number of capacitors in a bushing may be much greater than the four shown in this illustration.

The capacitors are shown diagrammatically as being shunted by resistors 24, 26, 28, and 30, respectively, which represent the dielectric and leakage losses in the bushing insulation. A capacitance tap 32 is brought out from between the ground capacitor unit 18 and the unit 16. Although a single capacitor unit 18 is shown between the capacitance tap 32 and ground 22, actually it may consist of several layers of metallic foil and insulation in series.

Thus, the bushing may be represented simply by two capacitances, $C_1$ the capacitance of the main insulation between the high voltage terminal and the capacitance tap 32 (that of capacitors 12, 14, and 16, in series), and the capacitance $C_2$ of the insulation between the capacitance tap 32 and ground 22 (that of capacitor 18).

A first embodiment of the invention is illustrated by FIG. 1 in which an impedor Z in the form of a low reactance capacitor 34 is permanently connected in parallel with capacitor 18 between tap 32 and ground 22. Leads 36 and 38 are provided to permanent female connectors 40, 42, which are arranged to permit connection to external circuitry and which may be, for example, in a polarized plug insulated from the housing of the high voltage bushing by additional small insulated bushings. The bushing 10 is connected between one conductor 20 of a high voltage power line and ground 22, the conductor operating at $E_h$ volts to ground.

Capacitor 34, connected permanently between capacitance tap 32 and ground as shown, limits the voltage at the capacitance tap to a low value, the magnitude of the impedance of impedor Z being chosen sufficiently low in comparison with that of $C_2$ so that practically the entire current $I_1$ from $C_1$ flows through Z, and sufficiently low in comparison with that of $C_1$ so that it may be ignored in determining the current through $C_1$ due to line voltage $E_h$. In a 115-kV (66-kV to ground) bushing, a nominal value of $C_1$ is 330 picofarads, which at a frequency of 60 Hz gives an impedance of about 8 megohms. The nominal capacitance $C_2$ of such a bushing is 2,700 picofarads, which at a frequency of 60 Hz gives an impedance of about 1 megohm. For the foregoing 66-kV bushing, an impedor Z having an impedance of 100 ohms or less meets the requirements.

An external measuring circuit, shown connected across impedor 34 at connectors 40 and 42 by leads 44 and 46, respectively, includes high gain amplifier 48 (for example, Analog Devices, Inc., Model 118) having positive input terminal 50 connected to lead 44, output terminal 52 connected to ground 22 through potentiometer 54, and negative input terminal 56 connected to contactor 58 on potentiometer 54. Thus, a negative feedback network is formed, and since the gain of amplifier 48 is of the order of 105, the amplification factor, $k$, of the network is determined by the position of contactor 58.

Output terminal 52 is also connected to contactor 60 on potentiometer 62, having a total resistance of $R_2$ ohms, through high input impedance voltmeter 64. Contactor 60 is at a position corresponding to a setting $R_1$ ohms from ground. Potentiometer 62 has one side grounded and is connected over long shielded leads 66 to the reference voltage, which in this case appears across the secondary winding 68 of a potential transformer 70. The primary winding 72 of potential transformer 70 is connected between high voltage conductor 20 and ground 22. For purposes of illustration the voltage between conductor 20 and ground 22 is referred to as $E_h$, that across impedor 34, as $E_z$, that across potentiometer 54 as $E_1$, that across secondary winding 68, as the reference voltage $F_s$, and that between contactor 60 and ground 22 as $E$'s. Reference voltage $E_s$ is in phase with $E_h$ and in a known ratio, $E$, thereto and is obtained from the secondary winding 68 of potential transformer 70. $E_s$ must have a known ratio to $E_h$ and can be either in phase with it or have a known phase angle relation thereto. The reference voltage alternatively may be obtained from a bushing connected to the same high voltage line 20 and whose capacitance and phase angle are known or from the apparatus disclosed in U.S. Pat. Nos. 2,922,952 and 3,272,051, both of which are issued to E. H. Povey and C. L. Dawes. The potential transformer or other apparatus, which supplies the reference voltage, is often located in the switchyard some distance remote from the bushing under test. Accordingly, long shielded leads 66 may be necessary to conduct the reference voltage $E_s$ to the output voltage $E$'s for comparison. Such leads should produce no significant attenuation or phase shift in the signal and they should also be shielded to exclude any interference from stray electric and magnetic induction that may be present.

The operation of the system is best understood by an analysis of the circuit voltages and currents. Because of the low impedance of the impedor Z (34) relative to that of section $C_1$ of the bushing, the bushing current $I_1$ is given with a high degree of accuracy by the following equation:

$$I_1 = E_h \, \omega C_1 \text{ at angle } (90° - \alpha), \qquad (1)$$

where $\omega$ is the angular frequency of the alternating line voltage $E_h$, the angle $(90° - \alpha)$ is referenced from the line voltage $E_h$, and $\alpha$ is the defect angle of $C_1$, a measure of the loss characteristic of $C_1$. The current $I_1$ leads $E_h$ by $(90° - \alpha)$ as shown in FIG. 2, which is a phasor diagram of the system. For clarity the diagram is not drawn to scale. The current $I_1$ divides at tap 32, only an insignificant amount going to ground 22 through $C_2$ because of its high impedance relative to that of Z (34). The current goes to ground 22 through Z (34), practically none entering terminal 50 of amplifier 48 since the latter has almost infinite input impedance.

The voltage $E_z$, at the positive terminal 50 of amplifier 48 is $$E_z = \frac{I_1}{\omega C_{34}} \angle -90° \qquad (2)$$

Substituting $I_1$ from Equation (1)

$$E_z = E_h \frac{\omega C_1}{\omega C_{34}} \angle (90° - \alpha) \angle -90°$$

$$= E_h \frac{C_1}{C_{34}} \angle -\alpha \qquad (3)$$

which is shown in the phasor diagram of FIG. 2. $E_z$ is amplified with no change in phase to the voltage $E_1$ where $$E_1 = kE_z \qquad 4$$

$k$ being the amplification factor of amplifier 48, as determined by the contactor setting of potentiometer 54.

The reference voltage $$E_s = E_h/K, \qquad 5$$

where $K$ is the known potential transformer ratio.

The voltmeter 64 measures the voltage difference between the amplifier output terminal 52 at voltage $E_1$ and the contactor 60. Contactor 60 is moved along the potentiometer 62 until the reading of voltmeter 64 reaches a minimum value $E_o$ shown in the phasor diagram, FIG. 2. A study of FIG. 2 shows that while the contactor 60 is being moved along the potentiometer, the voltage measured by the voltmeter 64 will vary between such limits as are indicated by the dotted lines originating at $E_1$. It is obvious that when the voltage difference between $E_1$ and contactor 60, measured by voltmeter 64, reaches a minimum value $E_o$, $E_o$ becomes perpendicular to $E_s$, and the corresponding voltage at the contactor becomes $E$'s. Then $$\tan \alpha = E_o/E\text{'s} \qquad 6$$

$$\sin \alpha = E_o/E_1 \qquad 7$$

To determine the bushing capacitance $C_1$, note that $C_1$ and $C_{34}$ form a capacitor divider (neglecting the effect of $C_2$), $$E_h/E_z = (C_1 + C_{34})/C_1 \qquad 8$$

$C_1$ is small compared with $C_{34}$ that it may be neglected. Hence (8) becomes $$E_h/E_z = C_{34}/C_1. \qquad 9$$

From FIG. 2, $$E_1 = E'_s / \cos \alpha = E_s (R_1/R_2) / \cos \alpha \qquad 10$$

where $R_2$ is the total resistance of the potentiometer and $R_1$ is the amount of resistance to ground tapped off by the contactor 60 to provide voltage $E'_s$.

The angle $\alpha$ is so small that $\cos \alpha$ is essentially unity, therefore, $$E_1 = E_s(R_1/R_2). \qquad (11)$$

Combining (4), (5), (9) and (11), the capacitance, $$C_1 = R_1 C_{34}/kK R_2. \qquad (12)$$

The values of $R_1$, $R_2$, $k$, $K$, and $C_{34}$ are known or may be determined easily, so that the apparatus provides a simple, yet accurate, method for determining the value of $C_1$. Furthermore, the measurements may be taken while bushings are in service and without opening the tap connections and the measuring circuit can conveniently consist of a portable self-contained test set 76 (FIG. 3) which may be readily and safely plugged into the bushing test connections.

Another embodiment of the invention is shown in FIG. 4. This embodiment includes a resistive impedor 80, with no appreciable phase shift, connected in series with an inductive impedor 81 between tap 32 and ground 22. Leads 36, 37, and 38 are brought out to female connectors 41, 40, and 42.

When a first test connection is made as shown in FIG. 4, inductor 81 is shorted by jumper 82 and the capacitance tap 32 is connected to the negative terminal 83 of operational amplifier 84 (for example, Analog Devices, Inc., Model 118) through a fixed resistor 86 and a variable resistor 88, which preferably is a multi-turn device. The positive terminal 90 of operational amplifier 84 is connected to ground 22 and feedback capacitor 92 is connected between the negative terminal 83 and the amplifier output terminal 94. A potentiometer 96, preferably with a multiturn dial, is connected between output terminal 94 and ground 22, its contactor 98 being connected to the negative terminal 83 of amplifier 84 through a fixed resistor 100. Resistor 100, capacitor 92, and potentiometer 96 comprise a phase-shifting circuit designed to produce a small phase shift in $E_{21}$, the output voltage of the system. This phase-shifting circuitry is advantageous since it provides a control which can be given a linear calibration in terms of an angle $\beta$ (Equation 16 below) and when $\beta$ is small, such as is usual with bushings, the multi-turn dial on potentiometer 96 can be calibrated directly in terms of power factor. In contract, the usual resistor-capacitor, phase-shifting circuit requires an inverse calibration. As is well known to those skilled in the art, operational amplifiers have a very high internal gain, so that for normal output voltages, the potential difference between the two input terminals is so small that it usually can be neglected. Also, the input impedance of operational amplifiers is usually so high that practically no current flows into their input terminals.

The output terminal 94 of amplifier 84 is connected through a fixed resistor 102 and variable resistor 104, preferably of the dial operated type, to the negative terminal 106 of a second operational amplifier 108 (for example, Analog Devices, Inc., Model 118). The positive terminal 110 of amplifier 108 is connected to ground 22 and a feedback resistor 112 is connected between negative terminal 106 and the output terminal 114. The magnitude of output voltage $E_{21}$ can be controlled by varying the resistance of resistor 104.

For the purpose of illustration, reference voltage $E_s$ is supplied by the secondary of a potential transformer 116 whose primary is connected to the high-voltage conductor 20. As will be shown later when variable resistor 104 has been set in accordance with the known ratio $E_h/E_s = K$, and the variable resistor 88 and potentiometer 96 have been adjusted to make output voltage $E_{21}$ equal in phase and magnitude to $E_s$, the capacitance and defect angle (or the power factor) of the main insulation of the bushing $C_1$ may be read from appropriate dials on resistor 88 and potentiometer 96, respectively. It should be noted that the functions of the variable resistors 104 and 88 may be interchanged or combined in either resistor; the arrangement shown is a convenient one.

The condition noted above, that is when the output voltage $E_{21}$ has been brought to equality with the reference voltage $E_s$, is indicated by the null detector 120 (for example, a millivoltmeter) connected between the output terminal 114 of amplifier 108 and the output terminal of the secondary of the potential transformer 116 (through shielded leads 118).

The development of the output voltage $E_{21}$ from the bushing current $I_1$ will be followed through the circuit. The current $I_1$ through $C_1$ may be represented to a high degree of accuracy of Equation 1:

$$I_1 = E_h \omega C_1 \text{ at angle } (90° - \alpha), \qquad (1)$$

Current $I_1$ divides at tap 32, an insignificant amount proceeding to ground through $C_2$, part ($I_{80}$) proceeding to ground through resistor 80, and part ($I_{86}$) proceeding to the negative input terminal 83 of the amplifier 84. Since positive input terminal 90 is grounded, and since no significant potential difference normally exists between the negative and positive terminals, negative input terminal 83 is at virtual ground potential. Under this condition, the relation between $I_1$ and $I_{86}$ is as follows:

$$I_{86} = I_1(R_{80})/(R_{80} + P_{86} + P_{88}) \qquad (13)$$

Since the ratio in Equation (13) is numeric, $I_{86}$ is in phase with $I_1$ (FIG. 5).

Currents arriving at negative input terminal 83 of amplifier 84 must add to zero, since no appreciable current flows into the input terminal. Therefore, $$I_{86} + I_{13} = 0, \text{ or } I_{13} = -I_{86}, \text{ or } I_{13} = I_{86} \underline{/180°} \qquad (14)$$

Amplifier 84 is required to produce an output voltage $E_{13}$ which will supply the required current $I_{13}$. Assuming for the moment that the contactor 98 of potentiometer 96 is at ground potential as shown in FIG. 4, and recalling that negative input terminal 83 is at virtual ground potential, then $I_{100}=0$ and $I_{13}=I_{92}$. The voltage $E_{13}$ (noting the relation expressed by (14)) must therefore be $$E_{13} = \frac{I_{13}}{\omega C_{92}} \underline{/-90°} = \frac{I_{86}}{\omega C_{92}} \underline{/90°} \qquad (15)$$

Resistor 100 is selected so that regardless of the position of contactor 98 of potentiometer 96, current $I_{100}$ never exceeds 1 percent of $I_{92}$. Since this small current is in quadrature with $I_{92}$, it has an insignificant effect on the magnitude of $I_{13}$ and hence of $E_{13}$. It will, however, affect the phase of $E_{13}$ by the angle $\beta$, where $$\beta = \tan^{-1}(I_{100}/I_{92}) \qquad (16)$$

so that expression 15 becomes $$E_{13} = \frac{I_{86}}{\omega C_{92}} \underline{/90° + \beta} \qquad (17)$$

Substituting $I_{86}$ from (13), $$E_{13} = I_1 \frac{R_{80}}{R_{80} + R_{86} + R_{88}} \frac{1}{\omega C_{92}} \underline{/90° + \beta} \qquad (18)$$

Remembering from (1) that $$I_1 = E_h \omega C_1 \;\underline{/90° - \alpha}$$

$$E_{13} = E_h \omega C_1 \;\underline{/90° - \alpha}\; \frac{R_{80}}{R_{80}+R_{86}+R_{88}} \; \frac{1}{\omega C_{92}} \;\underline{/90° + \beta},$$

$$= E_h \; \frac{R_{80}}{R_{80}+R_{86}+R_{88}} \; \frac{C_1}{C_{92}} \;\underline{/180° - \alpha + \beta} \quad (19)$$

The current into the second amplifier 108 is produced by the output voltage of the first amplifier 84 flowing through resistors 102 and 104. Here again, the positive input terminal 110 is at ground potential so that negative input terminal 106 is at virtual ground potential. The current flowing toward this terminal is $$I_{102} = E_{13}/(R_{102}+R_{104}) \quad 20$$

The output voltage $E_{21}$ of the amplifier 108 must produce an equal but opposite current through resistor 112. The output voltage must be $$E_{21} = \frac{E_{13} R_{112}}{R_{102}+R_{104}} \;\underline{/180°} \quad (21)$$

Substituting $E_{13}$ from (19), the output voltage becomes $$E_{21} = E_h \; \frac{R_{80}}{R_{80}+R_{86}+R_{88}} \; \frac{R_{112}}{R_{102}+R_{104}} \; \frac{C_1}{C_{92}} \;\underline{/\beta - \alpha} \quad (22)$$

Voltage $E_{21}$ can be varied in magnitude by adjusting $R_{104}$, the defect angle can be varied by adjusting $R_{96}$, and the capacitance can be varied by adjusting $R_{88}$, all of which are variable elements and are provided with calibrated dials.

The dial on $R_{88}$ is made to read in terms of capacitance in picofarads ($pF$), the dial reading being related to resistance by the following expression:

$$\text{Cap. Dial } (pF) = A \; (R_{80}+R_{86}+R_{88}), \quad 23$$

where $A$ is a constant. Note that the lowest dial reading is a value $A(R_{80}+R_{86})$ which occurs when $R_{88}$ is equal to zero.

The dial on $R_{104}$ is made to read in terms of ratio ($K$) and is related to the ratio by the expression $$\text{Ratio } (K) = B(R_{102}+R_{104}) \quad 24$$

where $B$ is a constant. Note that the lowest dial reading is a value of $K = BR_{102}$ which occurs when $R_{104}$ is equal to zero.

The dial on $R_{96}$ is made to read in terms of the angle $\beta$. In the discussion leading to the development of expression (16), it was pointed out that current $I_{100}$ can be varied from 0–1 percent of $I_{92}$ if contactor 98 of potentiometer 96 is moved from one extreme to the other. The angle $\beta$ is a function of the ratio of $I_{100}$ to $I_{92}$ as given by expression (16) which in the usual bushing is very small.

To operate the measurement system in order to obtain the capacitance and defect angle $\alpha$ of the bushing 10, first:

the ratio dial (104) is set for the known ratio $K$. The capacitance dial (88) and the defect angle dial (96) are adjusted simultaneously until the output voltage $E_{21}$ is equal to the standard reference voltage $E_s$ in phase and magnitude, as indicated by null detector 120. Obviously, to obtain zero angle, the defect angle control potentiometer (96) must be set so that its angle $\beta$ is equal to $\alpha$ the defect angle of the bushing, then $$E_s = E_h/K \;\underline{/0°} \quad 25$$

Under these conditions, using the relations (21), (22), (24), and (25), which gives $$E_h(AR_{80}/\text{Cap. Dial})(BR_{112}/K)(C_1/C_{92}) = E_h/K \quad 26$$

from which $$\text{Cap. Dial} = C_1 \; (ABR_{80}R_{112}/C_{92}) \quad 27$$

It will be seen that by selecting proper values for $A$, $B$, $R_{80}$, $R_{112}$, and $C_{92}$ that the last term in expression 27 can be reduced to unity and the capacitance dial will read the capacitance $C_1$ of the main insulation of the bushing.

The phasor diagram, FIG. 5, which for clarity is not drawn to scale, shows the relations among the voltages and currents of the circuit of FIG. 4 before the adjustments of capacitor dial 88, the ratio dial 104, and the phase potentiometer 96 dial have been adjusted to bring $E_{21}$ into phase and magnitude equality with $E_s$. The bushing current $I_1$ leads the voltage $E_h$ of the high-voltage conductor 20, by the angle $(90° - \alpha)$, where $\alpha$ is the defect angle of the bushing (Equation (1)). Since $Z$ is resistive, the voltage $E_z$ is in phase with $I_1$ and as no adjustment of potentiometer 96 has yet been made, its contactor 98 is at ground potential and $I_{100}$ is practically zero. From Equation (14), $I_{13} = -I_{86}$ and $I_{92} = I_{13}$, as shown. Capacitor 92 is connected between the negative terminal 83 of amplifier 84 and its output terminal 94, negative terminal 83 being virtually at ground potential. The voltage $E_{13}$ at terminal 94 must lead $I_{86}$ by 90° (Equation (15)) ($\beta = 0$, since no phase adjustment has yet been made). It thus leads $E_h$ by $(180° - \alpha)$, in accordance with Equation (19) with $\beta = 0$. In accordance with Equation (21), the phase of output voltage $E_{21}$ is 180° with respect to the $E_{13}$ and lags $E_h$ by the angle $\alpha$, in accordance with Equation (22) in which $\beta$ is zero.

FIG. 6 is a phasor diagram of the voltages and currents of FIG. 4 during the time that the adjustments are being made and after their completion. As stated earlier, to operate the measurement system, the ratio dial 104 is set for the known ratio $K$, and the capacitance dial 88 and the defect angle dial 96 are adjusted simultaneously. Setting the ratio dial 104 changes the magnitude of $E_{21}$ and the simultaneous adjustments of the capacitance dial 88 and the defect-angle dial 96 combine to bring $E_{21}$, FIG. 5, into coincidence with $E_s$, as is indicated in FIG. 6. Varying the dial 96 produces a small current $I_{100}$, shown in FIG. 6, which shifts the phase of the current $I_{13}$ in accordance with Equation 16, producing a phase change of $\alpha$ in $E_{13}$. This in turn causes a phase shift of $\alpha$ in $E_{21}$, FIG. 5, until $E_{21}$ is coincident in phase with $E_s$, as indicated in FIG. 6. Then the defect angle of the bushing $\beta = \alpha$ is read on the potentiometer dial 96 and the capacitance $C_1$ is read on dial 88.

In FIG. 7 is shown a second circuit connection of connectors 40–42. In this embodiment, resistor 80 is shorted by connecting jumper 150 across connectors 40 and 42. Partial discharges, originating in the insulating material, create current pulses which, coupled through the low impedance of the power system, produce voltages across impedor 81. The voltages contain certain frequencies which are accentuated by the circuit parameters, including the impedance characteristics of impedor 81, connecting leads 158 and 160, and the input circuit of the amplifier, as well as the $C_1$ and $C_2$ capacitances of the bushing. A suitable method of detecting such voltages is to employ a wide band (e.g., 20 kHz to 1MHz) amplifier. The lower limit of the band is selected to be well above any significant harmonics of the power-system frequency. A typical value of impedor 81 is 5–10 millihenries. The amplifier therefore also acts as a filter and the output signal on line 162 will be substantially free of the power frequency component. The signal is then observed on a suitable measurement and detecting device, for example the cathode-ray oscilloscope 164. Other detection devices such as a peak reading meter or a combination of high-pass filter, rectifier, and d-c meter may also be used.

Figure 8:
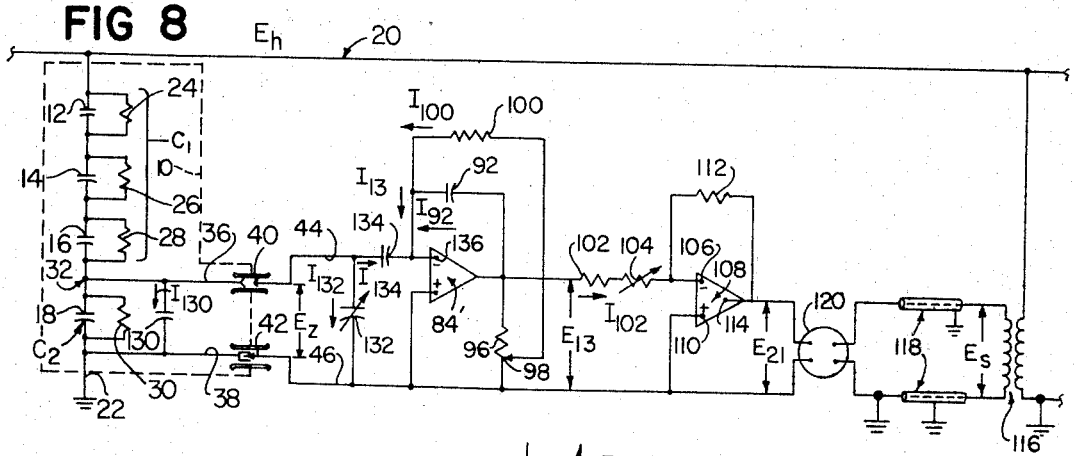
FIG. 8 is a schematic wiring diagram of still another embodiment of the invention.

Another embodiment of the invention is shown in FIG. 8 in which the impedor $Z$ consists of a fixed capacitor 130 with negligible defect angle. As with the capacitor 34 of FIG. 1 and the resistor 80 of FIG. 4, it is connected permanently between the capacitance tap 32 and ground 22. The reactance of capacitor 130 is so small compared with that of capacitance $C_2$ of the bushing that the portion of the bushing current $I_1$ that flows through $C_2$ is negligible compared with that which flows from the capacitance tap 32 to the capacitor 130 and the external measuring system. For example, if the capacitance of 130 is 27 $\mu f$, at a frequency of 60 Hz, its reactance is 88 ohms which is negligible as compared with the reactance of 1 megohm of $C_2$. As with the impedor $Z$ of FIGS. 1 and 4, the low value of the reactance of capacitor 130 combined with the fact that it is connected permanently between the capacitance tap 32 and ground 22 limits the voltage of the capacitance tap 32 to the safe value of only a few volts.

As in FIGS. 1 and 4, the terminals of the impedor 130 are connected to the external measuring circuit by means of leads 36 and 38 and test connectors 40 and 42 which preferably consist of a polarized plug receptacle. An adjustable capacitor 132 of negligible defect angle, and preferably with a dial scale, is connected between the two leads 44 and 46 of the external measuring system, thus connecting the capacitor 132 in parallel with capacitor 130 when the connection has been made. The upper lead 44 connects with the negative terminal 136 of amplifier 84' in series with capacitor 134. The system connections of FIG. 8 from amplifier 84' and beyond correspond with those of FIG. 4 as a study of the two Figures shows.

Figure 9:
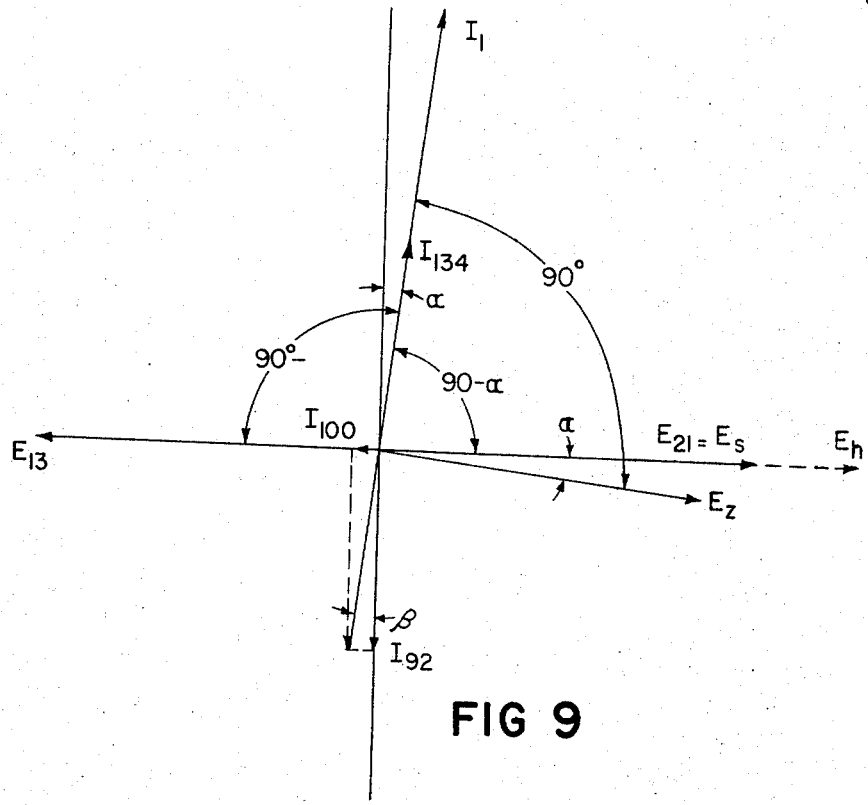
FIG. 9 is a phasor diagram of the system of FIG. 8 after adjustments have been made.

As in Equation (1) the current in bushing 10,
$$I_1 = E_h \omega C_1 \underline{/90° - \alpha},$$  (1)

which is shown in the phasor diagram, FIG. 9.

The current $I_1$ in the bushing 10 divides at capacitance tap 32, an insignificant amount flowing to ground through $C_2$, and the two components $I_{130}$ and $I_{132}$ flow to ground through capacitors 130 and 132 respectively. The remainder of the current $I_{134}$, flows through capacitor 134 to the negative terminal 136 of amplifier 84'. Since the negative terminal of amplifier 84' is essentially at ground potential, $C_{134}$ is equivalent to being in parallel with $C_{130}$ and $C_{132}$. Hence,
$$I = I_1 (C_{134})/(C_{130}+C_{132}+C_{134})$$  (28)

As the total impedance connected between capacitance tap 32 and ground 22 consists of the capacitors $C_{130}$, $C_{132}$, and $C_{134}$ in parallel, or equivalent, the voltage $E_z$ between capacitance tap 32 and ground will lag $I_1$ by 90°, as shown in the phasor diagram of FIG. 9.

As the ratio in Equation (28) is a numeric, the current $I_{134}$ is in phase with $I_1$, just as the similar Equation (13) shows that in FIG. 4, $I_{86}$ is in phase with $I_1$ as is shown in the phasor diagram of FIG. 5. Since no appreciable current can enter the negative terminal, as in Equation (14), $I_{134}+I_{13}=0$, or $I_{13}=-I_{134}$, and $I_{13}=I_{134} \underline{/180°}$  (29)

where $I_{13}$ is the current to $C_{92}$ and $R_{100}$.

In FIG. 8, $$E_{13}=\frac{I_{13}\underline{/-90°}}{\omega C_{92}}=\frac{I_{134}\underline{/90°}}{\omega C_{92}}$$  (30)

which corresponds to Equation (15).

$$E_{13}=\frac{I_{134}\underline{/90°+\beta}}{\omega C_{92}}$$  (31)

which corresponds to Equation (17).

Substituting $I_{134}$ from (28), $$E_{13}=I_1 \frac{C_{134}}{C_{130}+C_{132}+C_{134}} \frac{1}{\omega C_{92}} \underline{/90°+\beta}$$  (32)

Comparing (32) with (18), it is apparent that the expression $C_{134}/(C_{130}+C_{132}+C_{134})$ is equivalent to $R_{80}/(R_{80}+R_{86}+R_{88})$, and accordingly can be substituted for it in the Equations (19), and (22). Also, it follows that Equation (23) will become $A(C_{130}+C_{134}+C_{132})$ and that the dial $C_{132}$ will read in terms of the capacitance of the bushing.

The setting of the ratio dial 104 to the value $K$ and the adjustment of the capacitance dial 132 and that of the defect angle dial 96 are made as for FIG. 4. When the null detector 120 indicates a null reading, the voltage $E_{21}$ is in equality with $E_s$.

FIG. 9 is the phasor diagram for the system of FIG. 8 after the voltage $E_{21}$ has been brought into equality with $E_s$, and resembles FIG. 6. The voltage $E_z$ across the capacitor 130 now lags $I_{134}$ by 90°. The adjustment of the potentiometer 96 now introduces a small current $I_{100}$ producing the angle $\beta$ in accordance with Equation (16).

In the embodiments shown in FIGS. 4 and 8 the magnitude of the voltage $E_z$ developed across the impedor $Z$ is amplified, shifted in phase and its magnitude adjusted, until it is brought into equality with a reference voltage $E_s$. In the first embodiment (FIG. 1) the impedor voltage $E_z$ is merely amplified without change of phase, and is then compared with the reference voltage $E_s$ by means of a potentiometer and a high input impedance voltmeter. When the contactor of the potentiometer is adjusted until the reading of the voltmeter becomes a minimum, the power factor of the bushing and its capacitance are then accurately measured. In the embodiment shown in FIG. 7 partial discharge defects are sensed utilizing the fixed impedor principal of the other embodiments.

While particular embodiments of the invention have been shown and described, various modifications thereof will be apparent to those skilled in the art and therefore it is not intended that the invention be limited to the disclosed embodiments or to details thereof, the departures may be made therefrom within the spirit and scope of the invention.

What is claimed is:

1. Apparatus for measuring defect characteristics of a bushing while said bushing is in service connected to a high voltage source, said bushing having a grounded flange, a high voltage electrode passing through said grounded flange, sheet insulating material and metallic foil interwrapped around said electrode and a capacitance tap connection to a layer of said metallic foil near the outer wrap of said insulating material which capacitance tap connection is brought out to a terminal near said flange, comprising:

impedor means connected permanently between said capacitance tap terminal of said bushing and ground, the impedance of said impedor means being so low relative to that of said sheet insulating material and to that of said bushing between said capacitance tap terminal and ground that the current in said impedor means is determined almost solely by the impedance of said sheet insulating material and that the voltage between said capacitance tap terminal and ground never exceeds a value of one hundred volts, connector means permanently connected to said impedor means to permit the coupling of an external circuit to said impedor means without interruption of the current through said sheet insulating material, and an external circuit adapted to be coupled to said impedor means and responsive to a signal applied to said impedor means from said bushing for producing an output indicative of a bushing defect characteristic, said connector means permitting said external circuit to be detachably coupled to said impedor means.

2. Apparatus as claimed in claim 1 wherein said impedance of said impedor means is so low that substantially the entire current flowing through said sheet insulating material also flows through said impedor means, said impedor means forming an element of said external circuit designed to measure the capacitance and defect angle of said bushing, and wherein said external circuit includes detachable connecting means to permit the coupling of said external circuit to said impedor means without interruption of the current through said sheet insulating material, a first control to adjust the output voltage of said impedor in accordance with said capacitance of said bushing, amplifying means to increase the output voltage of said first control, means to shift the phase of the output of said amplifying means, magnitude control means to adjust the magnitude of the output voltage of first control, means to amplify the output voltage of said first control to produce an output voltage for comparison with a reference voltage, comparison means for comparing said output voltage with said reference voltage, and lead means for conducting said reference voltage to said comparison means.

3. Apparatus according to claim 2 wherein said impedor means is a fixed capacitor responsive to the current flowing therethrough to develop a voltage across said capacitor, said amplifying means comprises a high gain operational amplifier having an input terminal and an output terminal and being arranged to amplify said voltage across said capacitor to produce said output voltage, and said magnitude control means is an adjustable potentiometer defining a feedback loop between said output terminal and said input terminal to provide control over the magnitude of said gain and of said output voltage by adjustment of said potentiometer.

4. Apparatus as claimed in claim 3 wherein said comparison means comprises a second potentiometer arranged to be adjusted to vary the magnitude of said reference voltage conducted for comparison by said long shielded leads and having an output for comparison to said output voltage, and a voltmeter arranged to measure the difference between said output voltage and said output for comparison.

5. Apparatus as claimed in claim 4 wherein said second potentiometer is calibrated in terms of said capacitance of said bushing and is arranged to indicate said capacitance when said difference indicated by said voltmeter attains a minimum value.

6. Apparatus as claimed in claim 1 wherein the impedance of said impedor means is so low that substantially the entire current flowing through said sheet insulating material also flows through said impedor means, said impedor means forming an element of said external circuit designed to measure said capacitance and defect angle of said bushing, and wherein said external circuit includes detachable connecting means to permit the coupling of said external circuit to said impedor means without interruption of the current through said sheet insulating material, a first control calibrated in terms of said capacitance of said bushing, arranged to indicate said capacitance when the output voltage of said measuring system is in balance with a reference voltage, first amplifying means to augment the voltage output of said first control, means to shift the phase of the output voltage of said first amplifying means in conformity with the phase of said reference voltage, magnitude control means to adjust the ratio of the voltage at said high voltage electrode with said reference voltage, second amplifying means to increase the voltage output of said magnitude control means to produce a system output voltage, comparison means for comparing said output voltage with said reference voltage, and lead means for conducting said reference voltage to said comparison means.

7. Apparatus as claimed in claim 6 wherein said first amplifier is an operational amplifier having input and output terminals, said impedor is predominately resistive and of known magnitude, and said magnitude control comprises an adjustable potentiometer connected between said output terminal and ground and having its arm connected to a feedback circuit of said operational amplifier.

8. Apparatus as claimed in claim 2 wherein said impedor means is a fixed capacitor having a low reactance and said external circuit has adjustable capacitive control means arranged to be connected in parallel with said fixed capacitor.

9. Apparatus as claimed in claim 8 wherein said amplifying means has an output terminal, said adjustable capacitive control comprises said first control and said second control is an adjustable potentiometer connected between said output terminal and ground and having its arm connected to a feedback circuit of said operational amplifier.

10. Apparatus as claimed in claim 1 wherein said impedor means includes an inductor and a second impedor, said second impedor adapted to form an element of a measuring system designed to measure said capacitance and defect angle of said bushing, and said external circuit further includes indicating means responsive to high frequency signals produced by partial discharge phenomena and coupled by said inductor to provide indications of voids in said insulating material in said bushing.

11. Apparatus for measuring defect characteristics of a bushing having a high voltage electrode passing through a grounded flange, insulating material around said electrode and a capacitance tap, while said bushing is in service connected to a high voltage source, comprising:

impedor means connected permanently between said capacitance tap of said bushing and ground,
the impedance of said impedor means being so low relative to that of said insulating material and to that of said bushing between said capacitance tap and ground that the current in said impedor means is determined almost solely by the impedance of said insulating material and that the voltage between said capacitance tap and ground never exceeds a value of 100 volts, said impedor means including an inductor and a second impedor, said second impedor adapted to form an element of a measuring system designed to measure said capacitance and defect angle of said bushing, and external circuit means comprising
detachable connecting means to permit the alternate coupling of first and second external circuits to said inductive impedor and said second impedor without interruption of the current through said insulating material, said first external circuit including means responsive substantially only to frequencies substantially above the frequency of said high voltage source for producing output indicative of bushing partial discharge,
said second external circuit including transducing means for producing an output voltage as a function of the current flowing through said second impedor,
phase shifting means to adjust the phase of said output voltage in conformity with the phase of said reference voltage,
magnitude control means to adjust the magnitude of said output voltage in conformity with the magnitude of said reference voltage,
comparison means for comparing said output voltage with a reference voltage, and
lead means for conducting said reference and output voltages to said comparison means.

12. Apparatus as claimed in claim 11 wherein said second external circuit further includes
a first control associated with said magnitude control means to adjust the magnitude of said output voltage, said first control being calibrated in terms of the capacitance of said bushing and said known ratio of said low reference voltage to said high voltage, and
a second control associated with said phase shifting means to adjust the phase angle of said output voltage, said second control being calibrated in terms of the power factor of said bushing.

13. Apparatus as claimed in claim 12 wherein said transducing means comprises an operational amplifier.

14. Apparatus as claimed in claim 13 in which said second impedor is predominately resistive and of known magnitude.

15. Apparatus as claimed in claim 14 wherein said operational amplifier has input and output terminals, and said magnitude control comprises an adjustable potentiometer connected between said output terminal and ground and having its arm connected to a feedback circuit of said operational amplifier.

16. Apparatus as claimed in claim 15 wherein said second impedor is a fixed capacitor having a low reactance and said external circuit has adjustable capacitive control means arranged to be connected in parallel with said fixed capacitor.

17. Apparatus as claimed in claim 16 wherein said amplifier has an output terminal, said adjustable capacitive control comprises said first control and said second control is an adjustable potentiometer connected between said output terminal and ground and having its arm connected to a feedback circuit of said operational amplifier.

18. Apparatus for indication of bushing defect characteristics while said bushing is in service connected to a high voltage source comprising a bushing having a high voltage electrode, a grounded flange through which said high voltage electrode passes, insulating material around said electrode and a capacitance tap, impedor means connected permanently between said capacitance tap of said bushing and ground, said impedor means including an inductive impedor of low reactance producing a voltage in response to current flowing therethrough, and a second impedor connected in series with said inductive impedor, the impedance of said impedor means being so low relative to that of said insulating material and to that of said bushing between said capacitance tap and ground that the current in said impedor means is determined almost solely by the impedance of said insulating material and that the voltage between said capacitance tap and ground never exceeds a value of 100 volts, and means for coupling an external circuit to said impedor means for measurement of defect characteristics of said bushing, said coupling means enabling the alternate coupling of said inductive reactance to a first external circuit substantially responsive only to frequencies above that of the high voltage source for producing an output indicator of bushing partial discharge, and said second impedor to a second external circuit responsive to a low reference voltage having a known ratio to said high voltage source and a known phase relation thereto for producing an output indicative of bushing capacitance and defect angle.

19. Apparatus as claimed in claim 18 and further including polarized connector means permanently connected to said impedor means for permitting said external circuit to be detachably coupled to said impedor means.

* * * * *